(12) United States Patent
Ye et al.

(10) Patent No.: US 12,704,915 B2
(45) Date of Patent: Aug. 11, 2026

(54) TOUCHPAD DEVICE

(71) Applicant: TPK Advanced Solutions Inc., Xiamen (CN)

(72) Inventors: Cai Jin Ye, Xiamen City (CN); Tsai Kuei Wei, Hsinchu County (TW); Wei Yi Lin, Taoyuan City (TW); Chen Hsin Chang, Taoyuan City (TW)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 19/288,072

(22) Filed: Aug. 1, 2025

(65) Prior Publication Data

US 2026/0044222 A1 Feb. 12, 2026

(30) Foreign Application Priority Data

Aug. 12, 2024 (CN) ........................ 202411102586.2

(51) Int. Cl.

*G06F 3/0354* (2013.01)
*G06F 3/044* (2006.01)
*G06F 3/046* (2006.01)

(52) U.S. Cl.

CPC ........ *G06F 3/03547* (2013.01); *G06F 3/0445* (2019.05); *G06F 3/0448* (2019.05); *G06F 3/046* (2013.01)

(58) Field of Classification Search

CPC .. G06F 3/03547; G06F 3/0445; G06F 3/0448; G06F 3/046; G06F 3/0412; G06F 3/04164

See application file for complete search history.

(56) References Cited

U.S. PATENT DOCUMENTS 7,417,422 B2 * 8/2008 Kang .................. H01H 25/041 324/207.2
9,030,839 B2 * 5/2015 Leggett .................. G06F 1/182 345/173
10,381,419 B2 * 8/2019 Lee ...................... H10K 59/873
10,866,642 B2 * 12/2020 Rosenberg ............. G06F 3/045
11,093,009 B2 * 8/2021 Huang .................... G06F 1/169
11,422,631 B2 * 8/2022 Junus ...................... G06F 3/045
11,861,079 B1 * 1/2024 Yeh ...................... G02B 6/0068

(Continued)

FOREIGN PATENT DOCUMENTS

CN 107025017 B 8/2017

*Primary Examiner* — Benyam Ketema

(74) *Attorney, Agent, or Firm* — Cooper Legal Group, LLC

(57) ABSTRACT

A touchpad device includes a first assembly, a second assembly, and a plurality of elastic members. The first assembly includes a cover plate, an adhesive layer, and a circuit board. The cover plate has a bonding area and a non-bonding area. The adhesive layer is disposed under the cover plate and has a plurality of closed slots corresponding to the non-bonding area. The adhesive layer has a thickness of about 50 μm to about 500 μm. The circuit board is disposed under the adhesive layer and includes a touch sensing member and a coil layer. The second assembly includes a supporting member and a magnet set disposed on the supporting member. The elastic members are disposed between the first assembly and the second assembly and correspond to the closed slots in an arrangement direction of the cover plate and the adhesive layer.

10 Claims, 8 Drawing Sheets

(56) References Cited

U.S. PATENT DOCUMENTS

2012/0050114 A1* 3/2012 Li .......... H01Q 1/243 343/702
2012/0243719 A1* 9/2012 Franklin .......... H04R 1/02 381/333
2013/0016484 A1* 1/2013 Yoo .......... H04B 1/3833 361/752
2014/0111914 A1* 4/2014 Leggett .......... H01H 11/00 361/679.1
2014/0176478 A1* 6/2014 Kern .......... G06F 3/0488 345/173
2014/0307181 A1* 10/2014 Tang .......... G06F 3/0445 349/12
2015/0338883 A1* 11/2015 Farahani .......... G06F 3/03547 361/679.1
2018/0074694 A1* 3/2018 Lehmann .......... G06F 3/016
2019/0243475 A1* 8/2019 Huang .......... G06F 1/1681
2019/0265834 A1* 8/2019 Rosenberg .......... G06F 3/03543
2019/0339776 A1* 11/2019 Rosenberg .......... G06F 3/045
2020/0243612 A1* 7/2020 Lin .......... G06F 3/0448
2020/0301523 A1* 9/2020 Ho .......... H05K 1/0274
2020/0333917 A1* 10/2020 Lu .......... H01H 13/83
2020/0410070 A1* 12/2020 Strohmann .......... B06B 1/0614
2021/0064081 A1* 3/2021 Huang .......... H01H 21/12
2021/0168230 A1* 6/2021 Baker .......... G06F 1/1635
2021/0333880 A1* 10/2021 Junus .......... G06F 3/045
2021/0357003 A1* 11/2021 Wen .......... H04M 1/0266
2022/0011868 A1* 1/2022 Junus .......... G06F 3/045
2022/0091687 A1* 3/2022 Choi .......... G01L 1/205
2022/0164564 A1* 5/2022 Wu .......... G06V 40/1318
2022/0334645 A1* 10/2022 Junus .......... G06F 3/045
2023/0011372 A1* 1/2023 Chen .......... G06F 3/021
2023/0110133 A1* 4/2023 Dhar .......... G06F 3/045 345/173
2023/0236352 A1* 7/2023 Luo .......... G02B 6/0035 362/606
2023/0266829 A1* 8/2023 Sathe .......... G06F 1/169 345/168
2023/0305637 A1* 9/2023 Rosenberg .......... G06F 3/04144
2023/0333656 A1* 10/2023 Liu .......... G01L 1/122
2023/0376083 A1* 11/2023 Noh .......... G06F 3/03547
2023/0409131 A1* 12/2023 Chiu .......... G06F 1/169
2024/0028149 A1* 1/2024 Chiu .......... G06F 3/0416
2024/0231513 A1* 7/2024 Huang .......... G06F 3/03547
2024/0402854 A1* 12/2024 Glad .......... G06F 3/0446
2025/0060842 A1* 2/2025 Ye .......... G06F 3/03547
2025/0181168 A1* 6/2025 Ye .......... G06F 3/0443

* cited by examiner 230
214
S1
W
212a
S1
S1
212

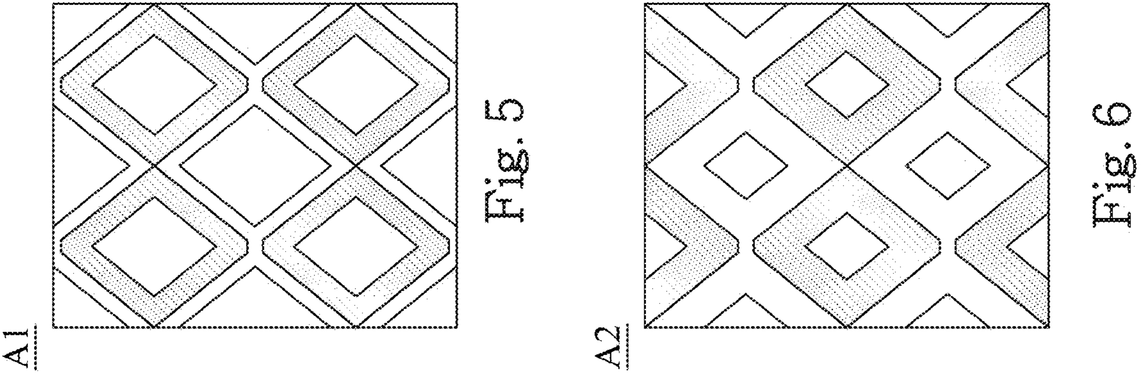
Fig. 5
Fig. 6
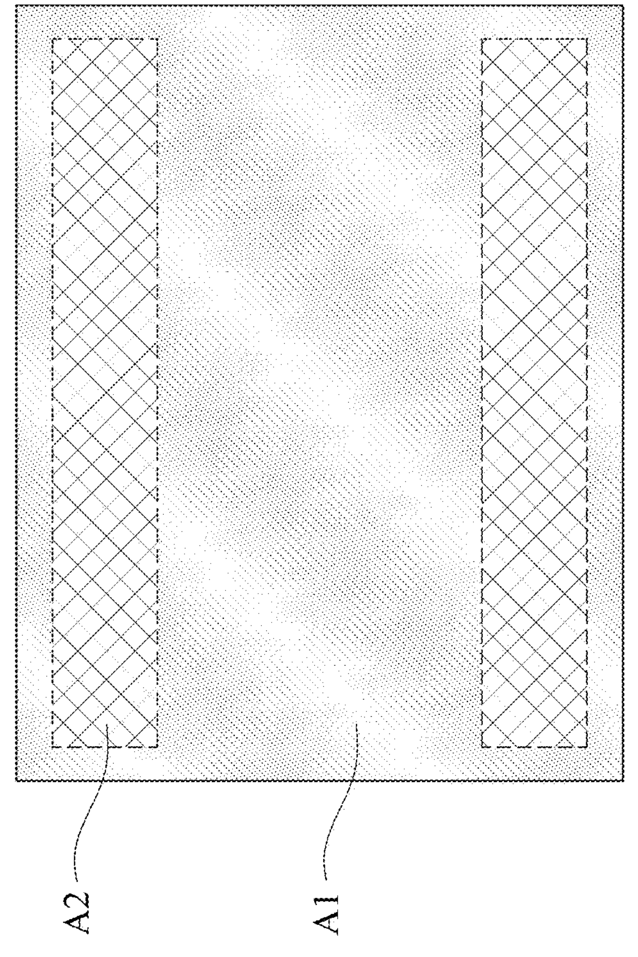
Fig. 4

TOUCHPAD DEVICE

CROSS-REFERENCE TO RELATED APPLICATION

This application claims priority to China Patent Application 202411102586.2, filed on Aug. 12, 2024, which is incorporated herein by reference.

FIELD OF DISCLOSURE

The present disclosure relates to a touchpad device.

DESCRIPTION OF RELATED ART

The current development trend of touchpad devices is the advancement from merely a touch function to an integration of touch, force sensing, and haptic feedback. Known touchpad devices of the prior art install a force sensor on an elastic component (such as a metal frame) and mount the elastic component to a touch printed circuit board such as, for example, those described in China Patent Application No. 107025017B. However, the disadvantages of these devices of the prior art include a large number of elements, complex assembly processes, higher overall costs, and generally greater thickness.

Therefore, tackling the aforementioned problems of touchpad devices is one of the major focuses that the industry invests its research and development resources in.

SUMMARY

In view of this, one objective of the present disclosure is to provide solutions to the aforementioned problems of touchpad devices.

To achieve the aforementioned objective, a touchpad device of one embodiment of the present disclosure comprises a first assembly, a second assembly, and a plurality of elastic members. The first assembly comprises a cover plate, an adhesive layer, and a circuit board. The cover plate has a bonding area and a non-bonding area. The adhesive layer is disposed under the cover plate and has a plurality of closed slots corresponding to the non-bonding area. The adhesive layer has a thickness of 50 μm to 500 μm. The circuit board is disposed under the adhesive layer and comprises a touch sensing member and a coil layer. The touch sensing member is configured to compensate for differences in detection capacitance signals between the bonding area and the non-bonding area. The second assembly comprises a supporting member and a magnet set disposed on the supporting member. The elastic members are disposed between the first assembly and the second assembly and correspond to the closed slots in an arrangement direction of the cover plate and the adhesive layer.

In one or several embodiments of the present disclosure, one of the closed slots is adjacent to an edge of the adhesive layer with a gap distance, and the gap distance is larger than 2 mm.

In one or several embodiments of the present disclosure, one of the closed slots has a width, and the width is larger than 10 mm.

In one or several embodiments of the present disclosure, the touch sensing member comprises a touch electrode layer. The touch electrode layer has a first sensing area and a second sensing area. The first sensing area and the second sensing area are arranged in a direction corresponding to the bonding area and the non-bonding area, respectively. A coil distance of the second sensing area is larger than a coil distance of the first sensing area.

In one or several embodiments of the present disclosure, the touch sensing member comprises a touch electrode layer and a processing unit. The touch electrode layer has a first sensing area and a second sensing area. The first sensing area and the second sensing area are arranged in a direction corresponding to the bonding area and the non-bonding area, respectively. The processing unit is electrically connected to the touch electrode layer and configured to compensate for differences in detection capacitance signals between the first sensing area and the second sensing area.

In one or several embodiments of the present disclosure, a material of the coil layer comprises copper. The circuit board further comprises a nickel layer wherein the nickel layer covers the coil layer.

In one or several embodiments of the present disclosure, the circuit board further comprises a metal layer wherein the metal layer covers the nickel layer.

In one or several embodiments of the present disclosure, the coil layer comprises a first coil unit and a second coil unit. A distance between the first coil unit and the second coil layer is equal to a coil distance of at least one of the first coil unit or the second coil unit.

In one or several embodiments of the present disclosure, the coil layer comprises a first coil unit and a second coil unit that are connected to each other. The magnet set comprises a first magnet and a second magnet. The first magnet has a first magnetic pole end, wherein the first magnetic pole end is arranged in a direction facing the first coil unit. The second magnet has a second magnetic pole end, wherein the second magnetic pole end is arranged in a direction facing the second coil unit. The first magnet and the second magnet are disposed side by side seamlessly. A polarity of the first magnetic pole end is different from a polarity of the second magnetic pole end.

In one or several embodiments of the present disclosure, the coil layer comprises a first coil unit and a second coil unit that are connected to each other. The magnet set comprises a first magnet, a second magnet, and a third magnet. The first magnet has a first magnetic pole end, wherein the first magnetic pole end is arranged in a direction facing the first coil unit. The second magnet has a second magnetic pole end, wherein the second magnetic pole end is arranged in a direction facing the second coil unit. The third magnet has a third magnetic pole end, wherein the third magnetic pole end is arranged in a direction facing a gap between the first coil unit and the second coil unit. The third magnet is disposed side by side with and located between the first magnet and the second magnet seamlessly. A polarity of the third magnetic pole end is different from a polarity of the first magnetic pole end and a polarity of the second magnetic pole end.

In summary, in the touchpad device of the present disclosure, by configuring closed slots on the adhesive layer disposed between the cover plate and the circuit board and disposing the elastic members as the supporting points arranged on the cover plate and the adhesive layer in a direction corresponding to the closed slots, the touchpad device can respond better to vertical vibrations in deformation in order to achieve the effect of strengthening the vertical vibration haptics. Moreover, the touch sensing member is configured to compensate for differences in detection capacitance signals between the bonding area and the non-bonding area. The differences in detection capacitance signals between the bonding area and the non-bonding area of the cover plate caused by the closed slots can be compensated for by the touch sensing member of the circuit board (for example, by means of magnetic pole structure or signal processing). By limiting the range of the distance between the closed slot and the adjacent edge of the adhesive layer, the problem that the adhesive layer fails to hold firmly onto the cover plate can be prevented. By limiting the range of the width of the closed slot, the problem that the deformation of the adhesive layer during vibration is too small can be prevented. By covering a nickel layer on the coil layer, the magnetic field lines generated by the magnet set on the coil layer can be gathered effectively. By designing the distance between two coil units of a coil layer to be essentially equal to the coil distance of the coil units (that is, without keeping an assembly tolerance between coil units), the area utilization rate of the circuit board can be increased. In correspondence to the aforementioned statements, by arranging magnetic pole ends of two adjacent magnets of the magnet set having different polarity respectively that face two coil units, these two magnets can be arranged side by side seamlessly.

The aforementioned statements are used to explain problems that can be solved by the present disclosure, the technical means for solving the problems, and the effect thereof. The present disclosure will become more fully understood from the detailed descriptions given herein below by way of embodiments with reference to the accompanying drawings for illustration only.

BRIEF DESCRIPTION OF THE DRAWINGS

To better understand the aforementioned objective and other objectives, novel features, advantages, and embodiments of the present disclosure, relevant diagrams are provided as follows.

FIG. 4 is a schematic diagram of the touch electrode layer of the touch sensing member of FIG. 2.

FIG. 5 is a partially enlarged schematic diagram of the first touch electrode layer of FIG. 4.

FIG. 6 is another partially enlarged schematic diagram of the first touch electrode layer of FIG. 4.

DETAILED DESCRIPTION

Figure 1:
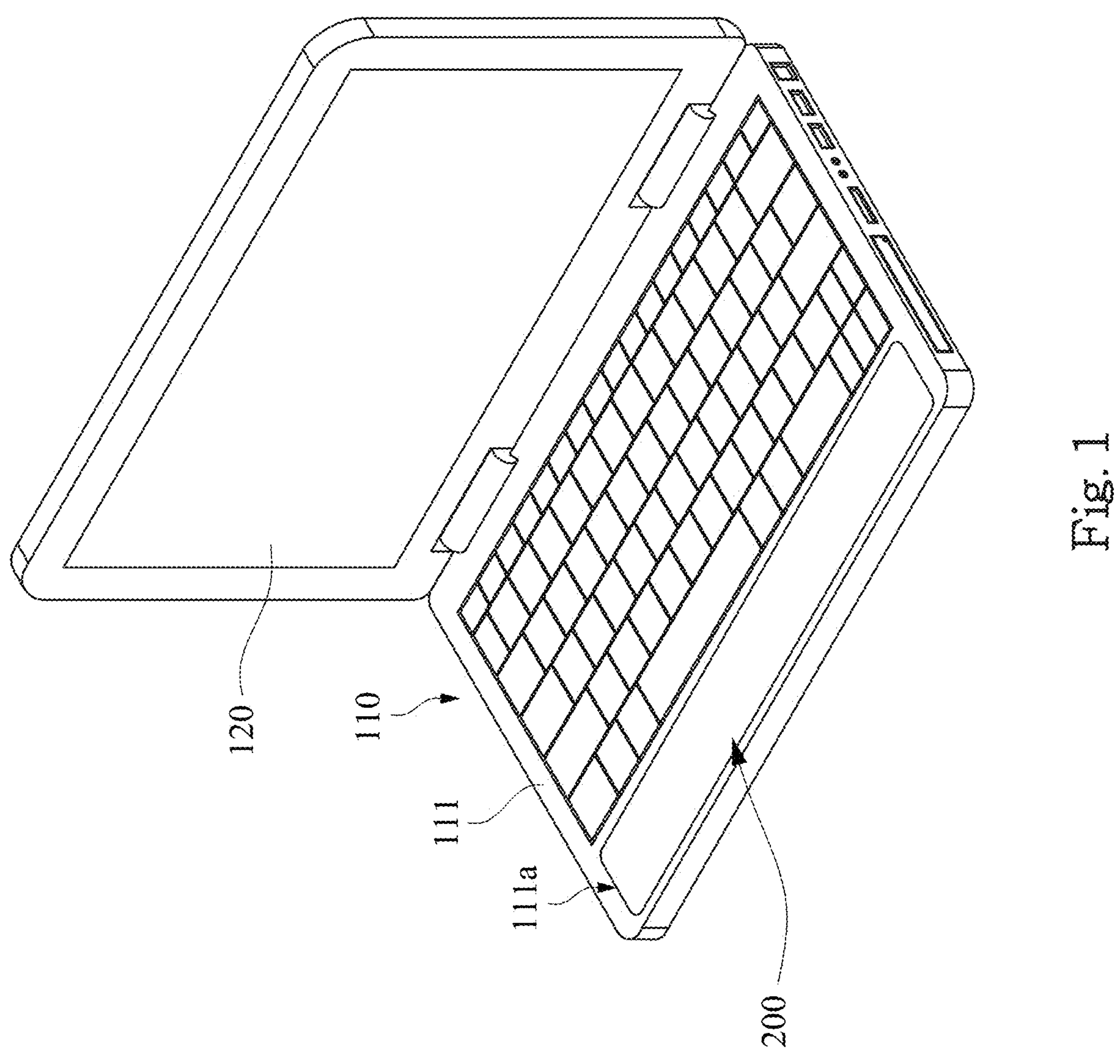
FIG. 1 is a schematic diagram of an electronic device according to an embodiment of the present disclosure.

A plurality of embodiments of the present disclosure will be disclosed below with reference to drawings. For the purpose of clear illustration, many details in practice will be described together with the following descriptions. However, these detailed descriptions in practice are for illustration only and shall not be interpreted to limit the scope, applicability, or configuration of the present disclosure in any way. That is, in several embodiments of the present disclosure, these details in practice are not necessarily required. Furthermore, for the purpose of simplifying drawings, some structures and components of the prior art shown in the drawings will be illustrated schematically.

Please refer to FIG. 1, which is a schematic diagram of an electronic device 100 according to an embodiment of the present disclosure. In the embodiment illustrated in FIG. 1, the electronic device 100 comprises a host computer 110, a display 120, and a touchpad device 200. The touchpad device 200 is disposed within the host computer 110 and is exposed to the outside from the recessed groove 111*a* of the casing part 111 of the host computer 110. The touchpad device 200 is, but is not limited to, an input device of the host computer 110 and is disposed therewithin. Furthermore, the touchpad device 200 is a rectangular area consisting of a length and a width, wherein the width W (a long strip as shown in FIG. 1) can be adjusted according to the design of different models, and the size is not limited to that shown in FIG. 1. In actual applications, the touchpad device 200 can be an electronic product (such as a personal digital assistant, a keyboard having a touchpad, etc.) using a touchpad as an input or operational interface. In other words, the concept of the touchpad device 200 of the present disclosure can be applied to any electronic products that use a touchpad as an input or operational interface. Details of the touchpad device 200, including the structure and functions of some elements thereof, and connections and the operation relationship among these elements will be provided below.

Figure 2:
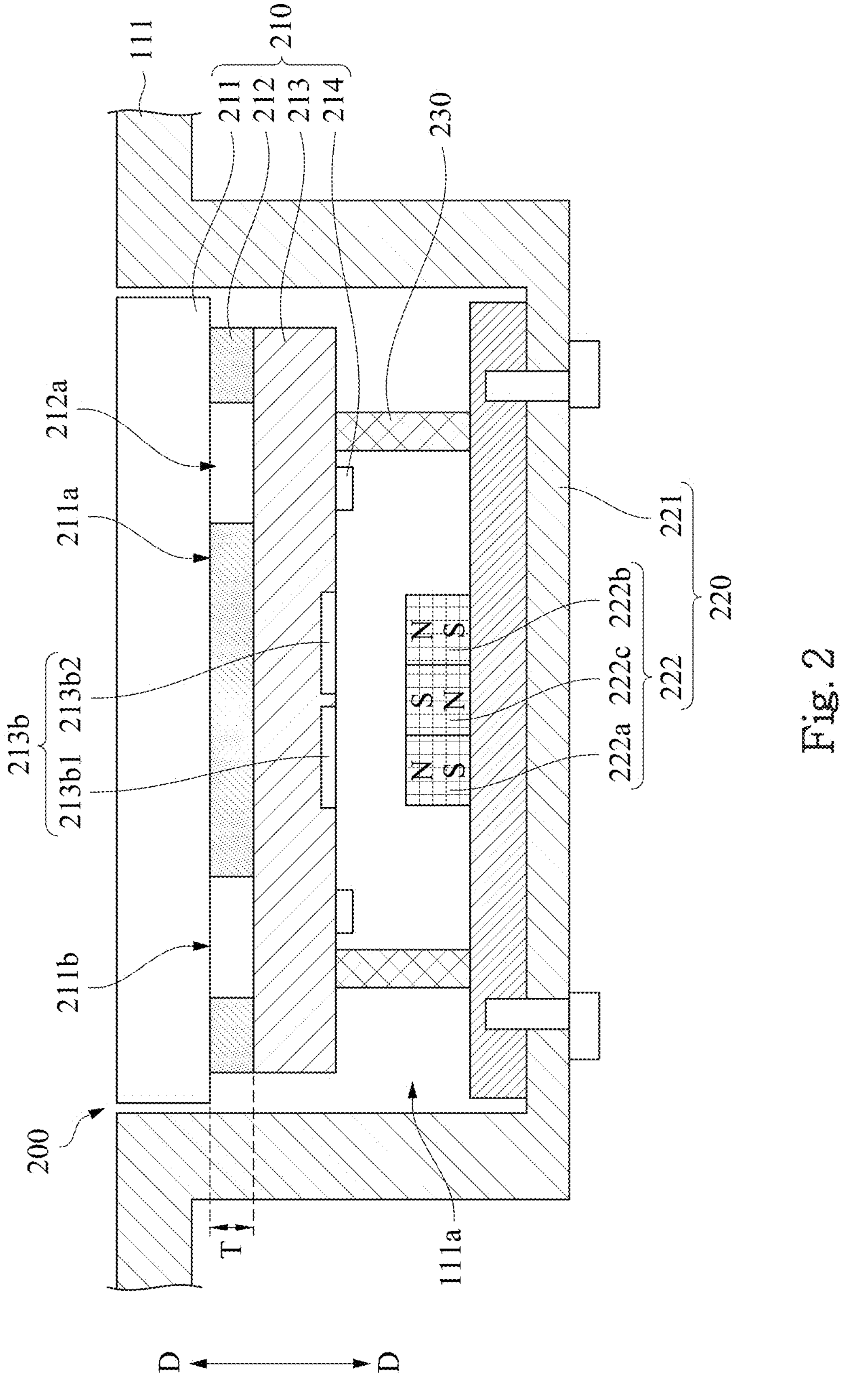
FIG. 2 is a cross-sectional schematic diagram of the touchpad device of FIG. 1.

Please refer to FIG. 2, which is a cross-sectional schematic diagram of the touchpad device 200 of FIG. 1. In the embodiment illustrated in FIG. 2, the touchpad device 200 comprises a first assembly 210, a second assembly 220, and a plurality of elastic members 230. The first assembly 210 comprises a cover plate 211, an adhesive layer 212, and a circuit board 213. The cover plate 211 has a bonding area 211*a* and a non-bonding area 211*b*. The adhesive layer 212 is disposed under the cover plate 211 and has a plurality of closed slots 212*a* corresponding to the non-bonding area 211*b*. The circuit board 213 is disposed under the adhesive layer 212 and comprises a touch sensing member 213*a* (in reference to FIG. 7) and a coil layer 213*b*. The second assembly 220 comprises a supporting member 221 and a magnet set 222 disposed on the supporting member 221. The supporting member 221 is fixed to the bottom surface of the recessed groove 111*a* of the casing part 111 (for example, using screws), wherein the recessed groove 111*a* is located on the outer surface of the casing part 111. The elastic members 230 are disposed between the first assembly 210 and the second assembly 220. The magnet set 222, disposed on the supporting member 221, and the coil layer 213*b*, disposed on the circuit board 213, constitute a vibration module. The elastic members 230 are configured to reduce vibration noise and effectively release vibration stress in the vertical direction.

For example, the bonding area 211*a* of the cover plate 211 can be defined as the area of the bottom surface of the cover plate 211 that is adhered with the adhesive layer 212. The non-bonding area 211*b* of the cover plate 211 can be defined as the area of the bottom surface of the cover plate 211 that is not adhered with the adhesive layer 212. However, the present disclosure is not limited thereto.

Figure 3:
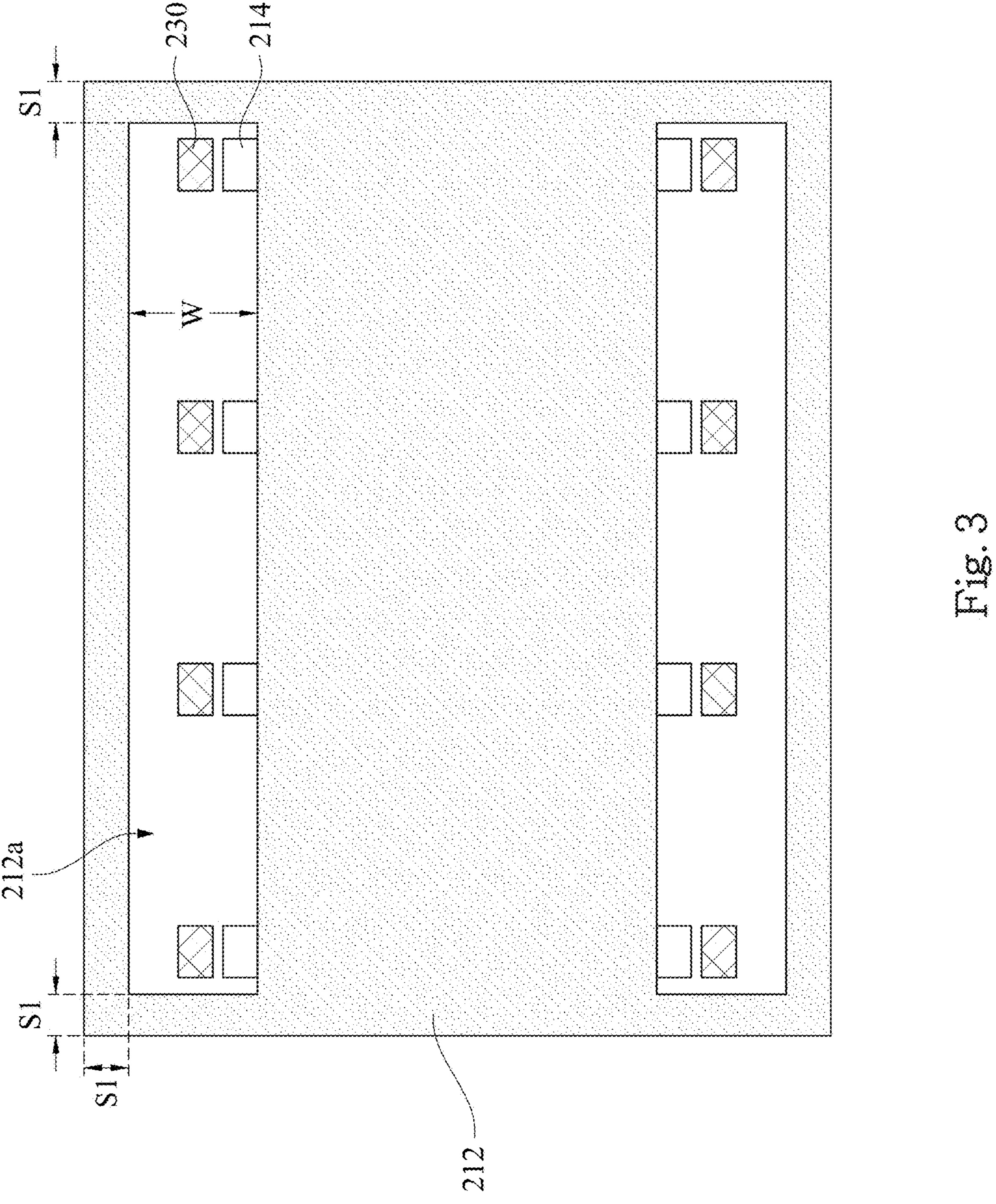
FIG. 3 is a schematic diagram of a top view of some elements of the touchpad device of FIG. 2.

Please refer to FIG. 3, which is a schematic diagram of a top view of some elements of the touchpad device 200 of FIG. 2. In the embodiment illustrated in FIG. 2 and FIG. 3, the elastic members 230 are disposed on the cover plate 211 and the adhesive layer 212, and the elastic members 230 correspond to the closed slots 212*a*. One thing to be noted is that by configuring closed slots 212*a* on the adhesive layer 212 disposed between the cover plate 211 and the circuit board 213 and by disposing the elastic members 230 as the supporting points arranged on the cover plate 211 and the adhesive layer 212 in a direction D corresponding to the closed slots 212*a*, the touchpad device 200 can respond better to vertical vibrations in deformation in order to achieve the effect of strengthening the vertical vibration haptics.

In several embodiments, the material of the adhesive layer 212 comprises, but is not limited to, pressure sensitive adhesive (PSA).

In several embodiments, as shown in FIG. 2, the adhesive layer 212 has a thickness T of about 50 μm to about 500 μm. If the thickness T of the adhesive layer 212 is smaller than 50 μm, when users press the cover plate 211, the adhesive layer 212 cannot provide sufficient compression level. If the thickness T of the adhesive layer 212 is larger than 500 μm, the adhesive layer 212 will affect the touch sensing member 213*a* (in reference to FIG. 7) in generating detection capacitance signals.

In several embodiments, Young's modulus of the elastic member 230 is in a range of 0.55 MPa to 0.8 MPa. Elastic members 230 having Young's modulus within the aforementioned range can effectively release vibration stress in the vertical direction.

In several embodiments, the material of the elastic member 230 can be, but is not limited to, silicone.

In several embodiments, the supporting member 221 is a silicon steel plate. The silicon steel plate has a permeability effect that can constrain the magnetic field from divergence so that the magnet field is more concentrated and the magnetic field lines are more concentrated within the same space.

In the embodiment, as shown in FIG. 3, one of the closed slots 212*a* (for example, the upper closed slot 212*a*) is adjacent to the edge of the adhesive layer 212 (for example, the upper edge of the adhesive layer 212) with a gap distance S1, and the gap distance S1 is larger than about 2 mm. By limiting the range of the gap distance S1 between the closed slot 212*a* and the adjacent edge of the adhesive layer 212 according to the aforementioned value, the problem that the adhesive layer 212 fails to hold firmly onto the cover plate 211 can be prevented. In addition, the gap distance between the upper closed slot 212*a* and the right adjacent edge or left adjacent edge of the adhesive layer 212 can be set as the aforementioned distance S1, as shown in FIG. 3. The gap distance between the lower closed slot 212*a* and the lower adjacent edge, or right adjacent edge, or left adjacent edge of the adhesive layer 212 can be set as the aforementioned distance S1, as shown in FIG. 3.

In the embodiment, as shown in FIG. 3, one of the closed slots 212*a* (for example, the upper closed slot 212*a*) has a width W. The width W is larger than about 10 mm. By limiting the range of the width W of the closed slot 212*a* according to the aforementioned value, the problem that the deformation of the adhesive layer 212 during vibration is too small can be prevented. More specifically, the closed slots 212*a* have the shape of a long strip, wherein the aforementioned width W is the smaller dimension in the horizontal plane of the closed slot 212*a*. Relatively, the larger dimension in the horizontal plane of the closed slot 212*a* is the length. The width of the lower closed slot 212*a* shown in FIG. 3 also can be set as the aforementioned width W.

Please refer to FIG. 4, FIG. 5, and FIG. 6. FIG. 4 is a schematic diagram of the touch electrode layer of the touch sensing member 213*a* of FIG. 2. FIG. 5 is a partially enlarged schematic diagram of the first touch electrode layer 213*a*1 of FIG. 4. FIG. 6 is another partially enlarged schematic diagram of the first touch electrode layer 213*a*1 of FIG. 4. In the embodiments, as shown in FIG. 4 to FIG. 6, the touch sensing member 213*a* comprises a first touch electrode layer 213*a*1. The first touch electrode layer 213*a*1 has a first sensing area A1 and a second sensing area A2. The first sensing area A1 and the second sensing area A2 are arranged in a direction D (in reference to FIG. 2) corresponding to the bonding area 211*a* and the non-bonding area 211*b* respectively (that is, the second sensing area A2 corresponds to the closed slot 212*a*). The coil distance of the second sensing area A2 is larger than the coil distance of the first sensing area A1.

According to Gauss's law, the capacitance is proportional to the permittivity. Therefore, when users touch and perform control on the cover plate 211, the touch sensing member 213*a* will produce differences between the bonding area 211*a* and the non-bonding area 211*b* in detection capacitance signals (since the permittivity of the adhesive layer 212 is greater than the permittivity of the closed slot 212*a*). The aforementioned differences result the detection capacitance signals produced by the touch sensing member 213*a* when users tap on the bonding area 211*a* of the cover plate 211 being larger than the detection capacitance signals produced by the touch sensing member 213*a* when users tap on the non-bonding area 211*b* of the cover plate 211. In the embodiment, by the design of having the coil distance of the second sensing area A2 be larger than the coil distance of the first sensing area A1, the technological effect of compensating differences between the bonding area 211*a* and the non-bonding area 211*b* in detection capacitance signals can be achieved by means of increasing the relevant areas. In other words, the touch sensing member 213*a* of the embodiment can compensate for the differences in detection capacitance signals by means of a magnetic pole structure.

In several embodiments, the touch sensing member 213*a* further comprises a second touch electrode layer 213*a*2 (in reference to FIG. 8), and the second touch electrode layer 213*a*2 can have areas identical or similar to the first sensing area A1 and the second sensing area A2 of the first touch electrode layer 213*a*1.

Figure 7:
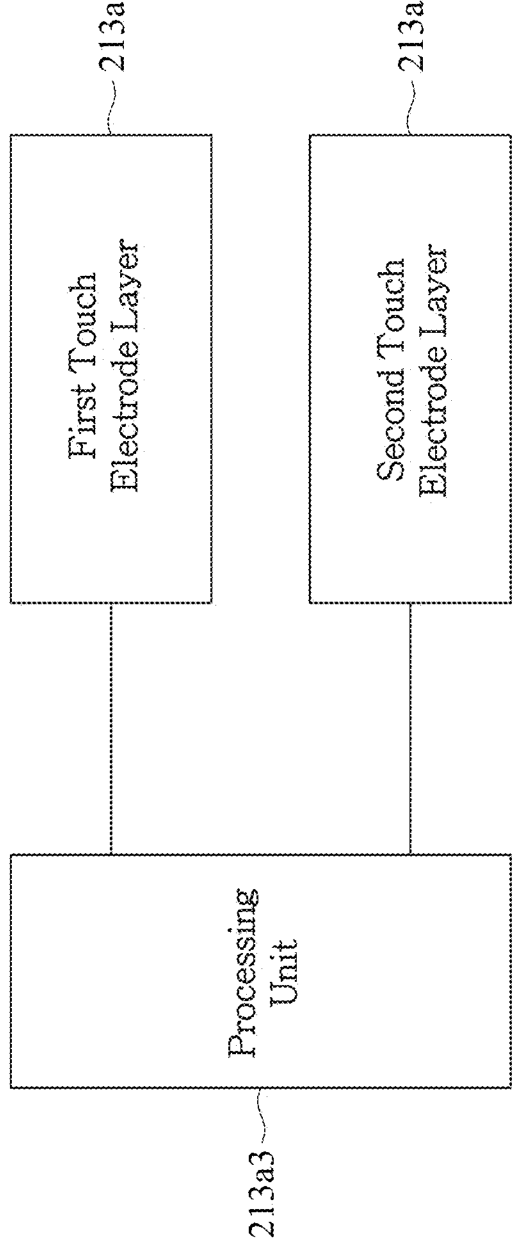
FIG. 7 is a block diagram of functions according to the touch sensing member of an embodiment of the present disclosure.

Please refer to FIG. 7, which is a block diagram of functions according to the touch sensing member 213*a* of an embodiment of the present disclosure. In the embodiment, as shown in FIG. 7, the touch sensing member 213*a* further comprises a processing unit 213*a*3. The processing unit 213*a*3 is electrically connected with the first touch electrode layer 213*a*1 and the second touch electrode layer 213*a*2 and configured to produce detection capacitance signals corresponding to the touch/tap on the cover plate 211 by users detected by the first touch electrode layer 213*a*1 and the second touch electrode layer 213*a*2. Especially, the processing unit 213*a*3 is further configured to compensate for differences in detection capacitance signals between the first sensing area A1 and the second sensing area A2. In other words, the touch sensing member 213*a* of the embodiment uses software methods to compensate for differences in detection capacitance signals.

Figure 8:
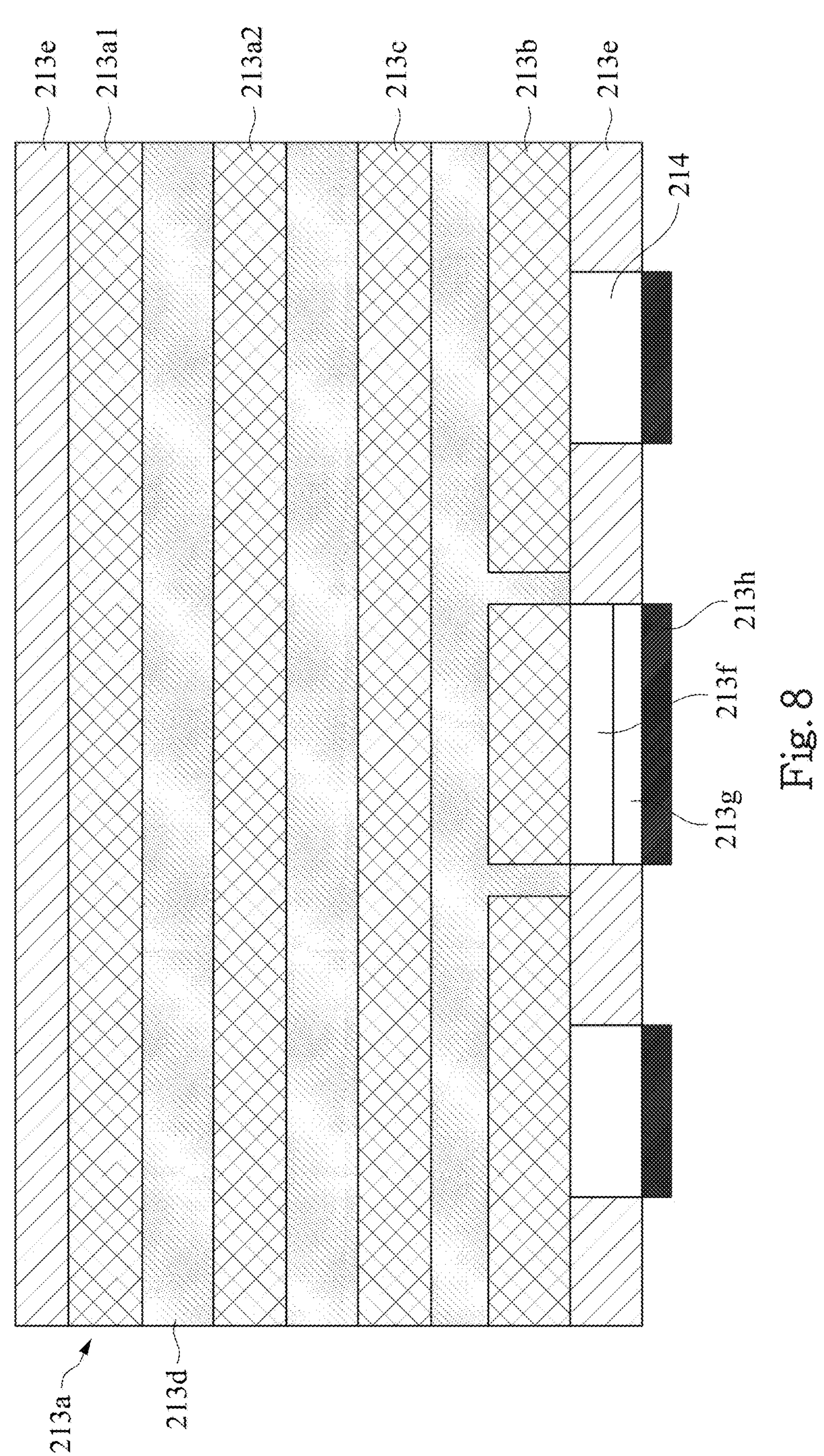
FIG. 8 is a cross-sectional schematic diagram of the circuit board of FIG. 2.

Please refer to FIG. 8, which is a cross-sectional schematic diagram of the circuit board 213 of FIG. 2. In the embodiment, as shown in FIG. 8, the circuit board 213 further comprises a shielding layer 213*c*. The first touch electrode layer 213*a*1, the second touch electrode layer 213*a*2, the shielding layer 213*c*, and the coil layer 213*b* are stacked in order from top to bottom and electrically insulated through the insulating layer 213*d*. The circuit board 213 further comprises two solder mask layers 213*e*. These two solder mask layers 213*e* are disposed on and below the sides of the circuit board 213, respectively, and cover and are in contact with the first touch electrode layer 213*a*1 and the coil layer 213*b*, respectively.

In the embodiment, as shown in FIG. 8, the material of the coil layer 213*b* comprises copper. The circuit board 213 further comprises a nickel layer 213*f*. The nickel layer 213*f* covers the coil layer 213*b*. By means of covering the coil layer 213*b* with the nickel layer 213*f* thereon, the magnetic field lines generated by the magnet set 222 on the coil layer 213*b* can be gathered effectively. In the embodiment, the circuit board 213 further comprises a metal layer 213*g*. The metal layer 213*g* covers the nickel layer 213*f*. By covering the nickel layer 213*f* with a metal layer 213*g* thereon, oxidation of the nickel layer 213*f* can be prevented. In the embodiment, the nickel layer 213*f* and the metal layer 213*g* are embedded in the solder mask layer 213*e*. The circuit board 213 further comprises a cover layer 213*h* that has the insulation function. The cover layer 213*h* covers the metal layer 213*g* to prevent the metal layer 213*g* from emerging from the solder mask layer 213*e*.

In the embodiment, as illustrated in FIG. 2 and FIG. 8, the first assembly 210 further comprises a plurality of force sensors 214. The force sensors 214 are disposed on the circuit board 213. The force sensors 214 are configured to generate force sensing signals in response to the deformation of the circuit board 213 (for example, the deformation of the cover plate 211 while being pressed by users). When the force sensors 214 produce force sensing signals, the processing unit 213*a*3, shown in FIG. 7, is configured to produce different vibration forces through the control of the vibration module based on the touch operations and force sensing signals, and then further provide the haptic feedback effect. Furthermore, as shown in FIG. 8, since the force sensors 214 are embedded in the solder mask layer 213*e*, and the force sensors 214 are covered with a cover layer 213*h*, the force sensors 214 will not emerge from the solder mask layer 213*e*.

Figure 9:
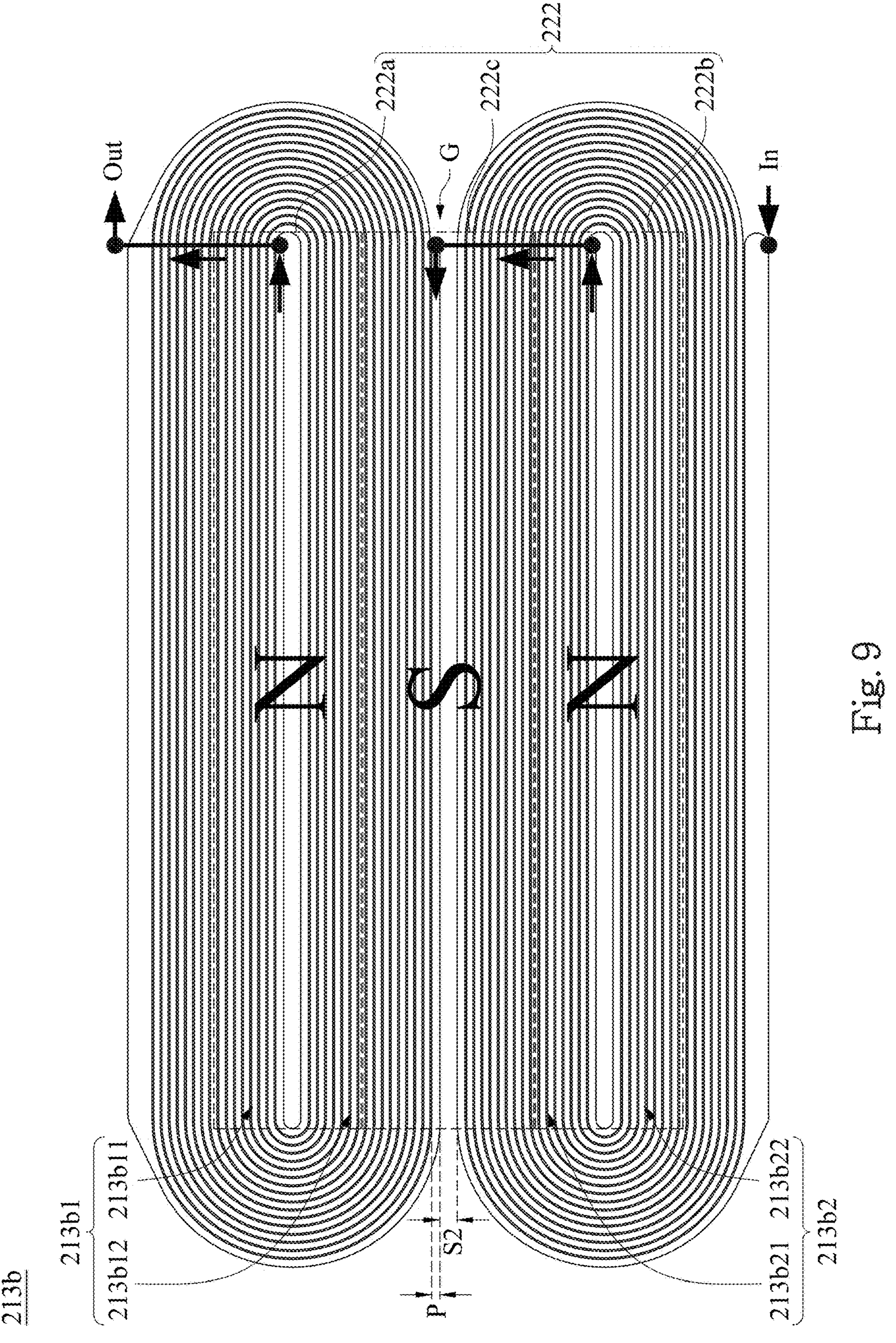
FIG. 9 is a schematic diagram of a top view of the coil layer and the magnet set of an embodiment of the present disclosure.

Please refer to FIG. 9, which is a schematic diagram of a top view of the coil layer 213*b* and the magnet set 222 of an embodiment of the present disclosure. In the embodiment, as shown in FIG. 9, the coil layer 213*b* comprises a first coil unit 213*b*1 and a second coil unit 213*b*2 that are connected to each other. The first coil unit 213*b*1 and the second coil unit 213*b*2 can be electrically coupled to external controllers (not shown in the figure). By designing the distance S2 between the two coil units 213*b*1, 213*b*2 of the coil layer 213*b* to be essentially equal to the coil distance P of the coil units (that is, without keeping an assembly tolerance between the first coil unit 213*b*1 and the second coil unit 213*b*2), the area utilization rate of the circuit board 213 can be increased.

In the embodiment, as shown in FIG. 9 along with FIG. 2, the magnet set 222 comprises a first magnet 222*a*, a second magnet 222*b*, and a third magnet 222*c*. The first magnet 222*a* has a first magnetic pole end, wherein the first magnetic pole end is arranged in a direction D (in reference to FIG. 2) facing the first coil unit 213*b*1. The second magnet 222*b* has a second magnetic pole end, wherein the second magnetic pole end is arranged in a direction D facing the second coil unit 213*b*2. The third magnet 222*c* has a third magnetic pole end, wherein the third magnetic pole end is arranged in a direction D facing the gap G between the first coil unit 213*b*1 and the second coil unit 213*b*2. The third magnet 222*c* is disposed side by side with and located between the first magnet 222*a* and the second magnet 222*b* seamlessly. The polarity of the third magnetic pole end is different from the polarity of the first magnetic pole end and the polarity of the second magnetic pole end. In response to the aforementioned design, these two magnets can be disposed side by side seamlessly without keeping an assembly tolerance between the first coil unit 213*b*1 and the second coil unit 213*b*2, through the arrangement of having two magnetic pole ends of two adjacent magnets of the magnet set 222 (that is, the first magnet 222*a* and the third magnet 222*c*, or the second magnet 222*b* and the third magnet 222*c*) with different polarities face the first coil unit 213*b*1 and the second coil unit 213*b*2 respectively.

More specifically, as illustrated in FIG. 9, the first coil unit 213*b*1 and the second coil unit 213*b*2 are produced by the same coil winding method and connected in series. The first coil unit 213*b*1 comprises two straight coil bundle sections 213*b*11 and 213*b*12, wherein the two straight coil bundle sections (213*b*11 and 213*b*12) are aligned horizontally and stacked vertically side by side. The second coil unit 213*b*2 comprises two straight coil bundle sections 213*b*21 and 213*b*22, wherein the two straight coil bundle sections (213*b*21 and 213*b*22) are aligned horizontally and stacked vertically side by side. The first magnet 222*a* is located partially below the straight coil bundle section 213*b*11 (in reference to the lower half portion of FIG. 9) and partially below the straight coil bundle section 213*b*12 (in reference to the upper half portion of FIG. 9), and the polarity of the first magnetic pole end facing the straight coil bundle sections 213*b*11 and 213*b*12 is the N pole. The second magnet 222*b* is located partially below the straight coil bundle section 213*b*21 (in reference to the lower half portion of FIG. 9) and partially below the straight coil bundle section 213*b*22 (in reference to the upper half portion of FIG. 9), and the polarity of the second magnetic pole end facing the straight coil bundle sections 213*b*21 and 213*b*22 is the N pole. The third magnet 222*c* is located partially below the straight coil bundle section 213*b*12 (in reference to the lower half portion of FIG. 9), partially below the straight coil bundle section 213*b*21 (in reference to the upper half portion of FIG. 9), and below the gap G between the first coil unit 213*b*1 and the second coil unit 213*b*2. The polarity of the third magnetic pole end facing the straight coil bundle sections 213*b*12 and 213*b*21 is the S pole. The electric current flows into the connecting point at the outer edge of the second coil unit 213*b*2 (located in the lower right area in FIG. 9) and flows out from the connecting point at the inner edge of the second coil unit 213*b*2. Subsequently, the electric current flowing out from the second coil unit 213*b*2 then flows into the connecting point (through the wire at the bottom) at the outer edge of the first coil unit 213*b*1 (located in the center area of the right portion in FIG. 9) and flows out from the connecting point (through the wire at the bottom) at the inner edge of the first coil unit 213*b*1. Through the aforementioned configuration, the magnet set 222 and the coil layer 213*b* are structured to be a vertical vibration module.

Figure 10:
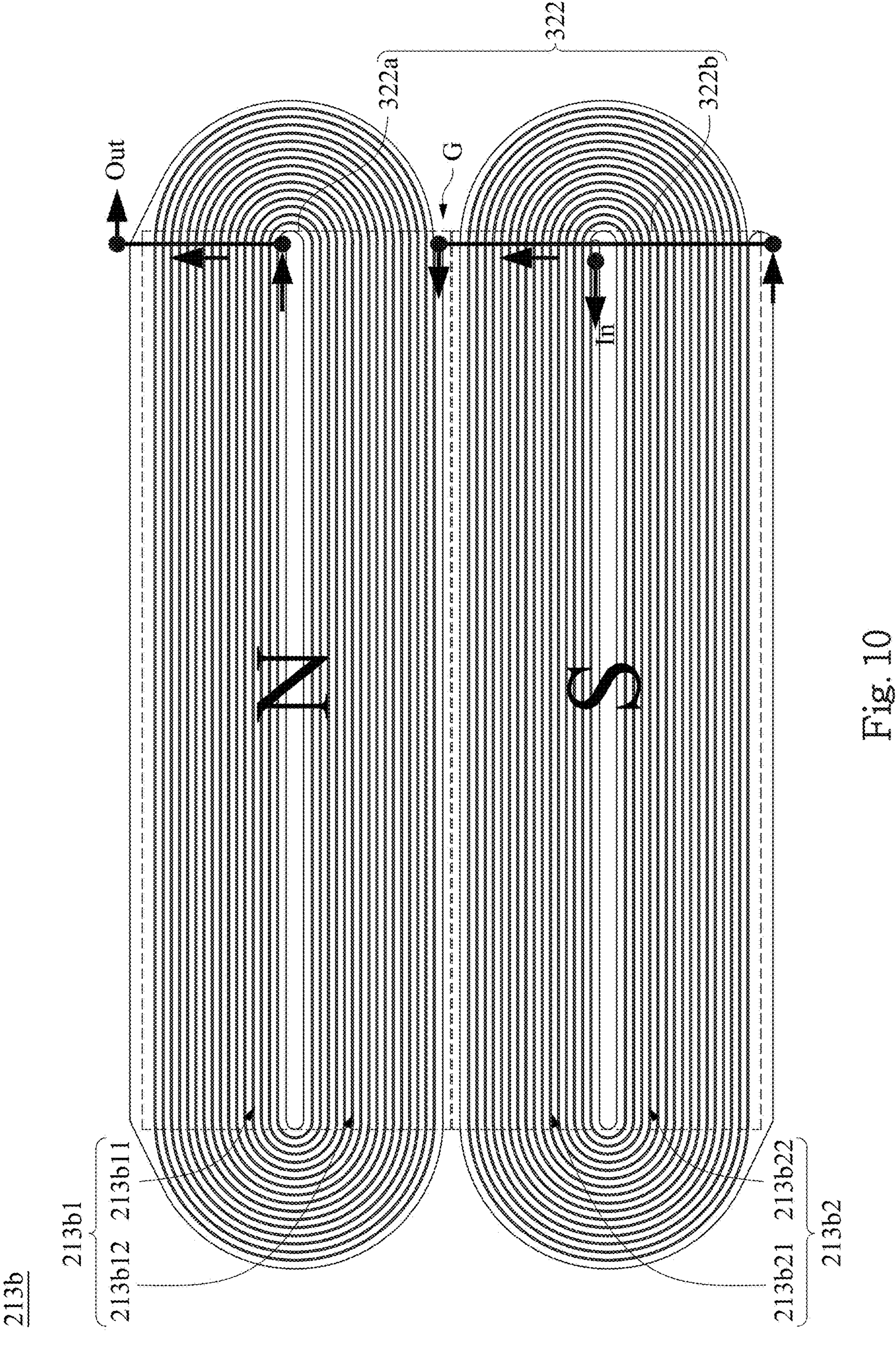
FIG. 10 is a schematic diagram of a top view of the coil layer and the magnet set of another embodiment of the present disclosure.

Please refer to FIG. 10, which is a schematic diagram of a top view of the coil layer 213*b* and the magnet set 322 of another embodiment of the present disclosure. In the embodiment, as shown in FIG. 10, the magnet set 322 comprises a first magnet 322*a* and a second magnet 322*b*. The first magnet 322*a* has a first magnetic pole end, wherein the first magnetic pole end is arranged in the direction D facing the first coil unit 213*b*1. The second magnet 322*b* has a second magnetic pole end, wherein the second magnetic pole end is arranged in the direction D facing the second coil unit **213*b*2. The first magnet 322*a* and the second magnet 322*b* are disposed side by side seamlessly. The polarity of the first magnetic pole end is different from the polarity of the second magnetic pole end. In response to the aforementioned design, the first magnet 322*a* and the second magnet 322*b* can be disposed side by side seamlessly without keeping an assembly tolerance between the first coil unit 213*b*1 and the second coil unit 213*b*2, through the arrangement of having the magnetic pole ends of the first magnet 322*a* and the second magnet 322*b* have different polarities face the first coil unit 213*b*1 and the second coil unit 213*b*2** respectively.

More specifically, as shown in FIG. 10, the first magnet **322*a* is located below the straight coil bundle sections 213*b*11 and 213*b*12, and the polarity of the first magnetic pole end facing the straight coil bundle sections 213*b*11 and 213*b*12 is the N pole. The second magnet 322*b* is located below the straight coil bundle sections 213*b*21 and 213*b*22, and the polarity of the second magnetic pole end facing the straight coil bundle sections 213*b*21 and 213*b*22 is the S pole. The electric current flows into the connecting point at the inner edge of the second coil unit 213*b*2. It flows out from the connecting point at the outer edge of the second coil unit 213*b*2 (located in the lower right area in FIG. 10). Subsequently, the electric current flowing out from the second coil unit 213*b*2 then flows into the connecting point (through the wire at the bottom) at the outer edge of the first coil unit 213*b*1 (located in the center area of the right portion in FIG. 10) and flows out from the connecting point (through the wire at the bottom) at the inner edge of the first coil unit 213*b*1. Through the aforementioned configuration, the magnet set 322 and the coil layer 213*b*** are structured to be a vertical vibration module.

According to the descriptions of specific embodiments of the present disclosure, it is apparent that, in the touchpad device of the present disclosure, by configuring closed slots on the adhesive layer disposed between the cover plate and the circuit board and disposing the elastic members as the supporting points arranged on the cover plate and the adhesive layer in a direction corresponding to the closed slots, the touchpad device can respond better to vertical vibrations in deformation in order to achieve the effect of strengthening the vertical vibration haptics. Moreover, as for the differences in detection capacitance signals between the bonding area and the non-bonding area of the cover plate, the touch sensing member of the circuit board is configured to compensate for the differences (for example, by means of magnetic pole structure or signal processing). By limiting the range of the distance between the closed slot and the adjacent edge of the adhesive layer, the problem that the adhesive layer fails to hold firmly onto the cover plate can be prevented. By limiting the range of the width of the closed slot, the problem that the deformation of the adhesive layer during vibration is too small can be prevented. By covering a nickel layer on the coil layer, the magnetic field lines generated by the magnet set on the coil layer can be gathered effectively. By designing the distance between two coil units of a coil layer to be essentially equal to the coil distance of the coil units (that is, without keeping an assembly tolerance between coil units), the area utilization rate of the circuit board can be increased. In correspondence to the aforementioned statements, by arranging magnetic pole ends of two adjacent magnets of the magnet set having different polarity respectively face two coil units, these two magnets can be arranged side by side seamlessly.

The aforementioned embodiments are chosen to describe the present disclosure and are not intended to limit the scope of the present disclosure in any way. Alternative embodiments will become apparent to those skilled in the art to which the present disclosure pertains without departing from its spirit and scope. The scope of the present disclosure is defined by the appended claims rather than the foregoing descriptions and the exemplary embodiments described therein.

COMPONENT SYMBOL

100: Electronic device
110: Host computer
111: Casing part
**111*a***: Recessed groove
120: Display
200: Touchpad device
210: First assembly
211: Cover plate
**211*a***: Bonding area
**211*b***: Non-bonding area
212: Adhesive layer
**212*a***: Closed slots
213: Circuit board
**213*a***: Touch sensing member
**213*a*1**: First touch electrode layer
**213*a*2**: Second touch electrode layer
**213*a*3**: Processing unit
**213*b***: Coil layer
**213*b*1**: First coil unit
**213*b*11, 213*b*12, 213*b*21, and 213*b*22**: Straight coil bundle section
**213*b*2**: Second coil unit
**213*c***: Shielding layer
**213*d***: Insulating layer
**213*e***: Solder mask layer
**213*f***: Nickel layer
**213*g***: Metal layer
**213*h***: Cover layer
214: Force sensor
220: Second assembly
221: Supporting member
222 and 322: Magnet set
**222*a* and 322*a***: First magnet
**222*b* and 322*b***: Second magnet
**222*c***: Third magnet
230: Elastic member
A1: First sensing area
A2: Second sensing area
D: Arrangement direction
G: Gap
P: Coil distance
S1 and S2: Distance
T: Thickness
W: Width

What is claimed is:

1. A touchpad device, comprising
a first assembly, which comprises:
a cover plate, having a bonding area and a non-bonding area;
an adhesive layer, disposed under the cover plate and having a plurality of closed slots that correspond to the non-bonding area, wherein the adhesive layer has a thickness of 50 μm to 500 μm; and
a circuit board, disposed under the adhesive layer and comprising a touch sensing member and a coil layer, wherein the touch sensing member is configured to compensate for differences in detection capacitance signals between the bonding area and the non-bonding area;

a second assembly, which comprises a supporting member and a magnet set disposed on the supporting member; and a plurality of elastic members, disposed between the first assembly and the second assembly, and corresponding to the closed slots in an arrangement direction of the cover plate and the adhesive layer.

2. The touchpad device of claim 1, wherein one of the closed slots is adjacent to an edge of the adhesive layer with a gap distance that is larger than 2 mm.

3. The touchpad device of claim 1, wherein one of the closed slots has a width that is larger than 10 mm.

4. The touchpad device of claim 1, wherein the touch sensing member comprises a touch electrode layer that has a first sensing area and a second sensing area, the first sensing area and the second sensing area are arranged in a direction corresponding to the bonding area and the non-bonding area, respectively, and a coil distance of the second sensing area is larger than a coil distance of the first sensing area.

5. The touchpad device of claim 1, wherein the touch sensing member comprises:

a touch electrode layer, which has a first sensing area and a second sensing area, wherein the first sensing area and the second sensing area are arranged in a direction corresponding to the bonding area and the non-bonding area, respectively; and a processing unit, which is electrically connected to the touch electrode layer and configured to compensate for differences in detection capacitance signals between the first sensing area and the second sensing area.

6. The touchpad device of claim 1, wherein a material of the coil layer comprises cooper, and the circuit board further comprises a nickel layer that covers the coil layer.

7. The touchpad device of claim 6, wherein the circuit board further comprises a metal layer that covers the nickel layer.

8. The touchpad device of claim 1, wherein the coil layer comprises a first coil unit and a second coil unit, and a distance between the first coil unit and the second coil unit is equal to a coil distance of at least one of the first coil unit or the second coil unit.

9. The touchpad device of claim 1, wherein the coil layer comprises a first coil unit and a second coil unit that are connected to each other, and the magnet set comprises:

a first magnet, having a first magnetic pole end, wherein the first magnetic pole end is arranged in a direction facing the first coil unit; and a second magnet, having a second magnetic pole end, wherein the second magnetic pole end is arranged in a direction facing the second coil unit, wherein the first magnet and the second magnet are disposed side by side seamlessly, and a polarity of the first magnetic pole end is different from a polarity of the second magnetic pole end.

10. The touchpad device of claim 1, wherein the coil layer comprises a first coil unit and a second coil unit that are connected to each other, and the magnet set comprises:

a first magnet, having a first magnetic pole end, wherein the first magnetic pole end is arranged in a direction facing the first coil unit;

a second magnet, having a second magnetic pole end, wherein the second magnetic pole end is arranged in a direction facing the second coil unit; and a third magnet, having a third magnetic pole end, wherein the third magnetic pole end is arranged in a direction facing a gap between the first coil unit and the second coil unit, wherein the third magnet is disposed side by side with and located between the first magnet and the second magnet seamlessly, and a polarity of the third magnetic pole end is different from a polarity of the first magnetic pole end and a polarity of the second magnetic pole end.

* * * * *